United States Patent Office 3,573,177
Patented Mar. 30, 1971

3,573,177
ELECTROCHEMICAL METHODS FOR PRODUCTION OF FILMS AND COATINGS OF SEMICONDUCTORS

William McNeill, Philadelphia, Pa., assignor to the United States of America as represented by the Secretary of the Army No Drawing. Continuation-in-part of application Ser. No. 399,941, Sept. 28, 1964. This application Jan. 11, 1968, Ser. No. 697,021
Int. Cl. C23b *11/00*
U.S. Cl. 204—32 4 Claims

ABSTRACT OF THE DISCLOSURE

Articles bearing an anodically electrolytically formed coating on its surface, the coating comprising, in the main, a compound made from either zinc or cadmium or cadmium-zinc alloys and sulfur and/or selenium, the compounds being electrochemically formed as compounds, and methods therefor.

The invention described herein may be manufactured, used, and licensed by or for the Government for governmental purposes without the payment to me of any royalty thereon.

This application is a continuation-in-part of my copending patent application, Ser. No. 399,941, filed Sept. 28, 1964, for "Electrochemical Method for Production of Films and Coatings of Semiconductors," now abandoned.

This invention relates to the production of films and coatings of semiconductors. More particularly, the invention concerns articles bearing films or coatings exhibiting semiconductor properties and an electrochemical method for the production thereof.

It is well known that certain compounds including zinc and cadmium sulfides and sulfoselenides, exhibit semiconductor properties, and as a result of such properties, are widely used in electronic and electro-optical devices. In these applications, the materials may be required in a variety of forms, a particularly useful one being that of a thin film. Examples of several such thin film uses are:

(1) generation of ultrasonic energy
(2) electroluminesence
(3) photoconductivity
(4) laser frequency conversion
(5) in thin film transistors In each of the above, the semiconductor film is formed on a supporting material, and, in general, should exhibit uniform thickness, freedom from porosity, satisfactory bonding thereof to substrate, and high dielectric breakdown strength. Other desirable features of materials of this type are their ability to form on interior surfaces of cavities, and to form patterns such as with integrated circuit components. Additionally, it is normally necessary that the semiconductor material contain very small quantities of impurities, or dopants, which are present in precisely controlled amounts. A highly desirable feature of the process used in forming these films is that the dopant be incorporated in the same step in which the film is formed in order to obviate subsequent processing involving heat and chemical agents which would tend to injury or destroy the films.

Another major problem in the production of semiconductor films involves the cleanliness of surfaces upon which the films are formed. One can readily note the very large expenditures currently being made for clean room installations by electronic materials and device fabricators.

Accordingly, a highly desirable feature of a process for growing semiconductor thin films is that the process exhibit a self-cleansing characteristic, i.e., that it remove foreign materials from the surfaces upon which the semiconductor film is subsequently to be grown.

In some applications involving semiconductor thin films, it is important that intimate contact be maintained between the semiconductor film and substrate. For example, a layer of impurity, or a gas pocket, or oxide film, and the like if interposed therebetween, would cause the electric field to be disturbed, resulting in defective products having poor electrical breakdown characteristics.

Two commonly known methods currently in use for the preparation of such semiconductor films are the vapor deposition method and the sedimentation method, the latter frequently incorporating electrophoresis to augment the gravity sedimentation of the finely divided semiconductor material. Both of these existing methods yield products which are generally porous in nature and which possess a dielectric breakdown strength considerably lower than desired. Further, these methods do not lend themselves to interior surface applications nor can accurate control of film thickness and composition be expected.

Accordingly, it is a broad object of the present invention to provide an article bearing a semiconductor film or coating which is attended by the foregoing advantageous characteristics.

Another object of the invention is to provide an article comprising a semiconductor film or coating characterized by improved semiconductor properties.

Still another object of the invention is to provide an electrochemical method of making an article having an improved semiconductor film or coating.

A further object of the invention is to provide an electrochemical method of making an article having a film or coating useful in electrical and electronic applications, which method permits the controlled formation of said film or coating to a fine degree.

Other objects of the invention will be obvious to those skilled in the art from the description as hereinafter contained.

The present invention comprises the production of semiconductor films or coatings exhibiting desirable properties by the anodic conversion process. As broadly contemplated, the invention comprises the electrolytic treatment of an anodic article consisting essentially of Cd, Zn, or Cd-Zn alloys in an electrolyte containing anions substantially all of which are yielded from S or Se.

In the prferred embodiments of the invention, films and coatings of zinc and cadmium sulfide and sulfoselenides, for example, are produced by the anodic conversion of zinc or cadmium or alloys consisting chiefly of these metals to the corresponding sulfides or sulfoselenides by electrolysis in electrolytes containing these anions in solution. While the anodic conversion process may be carried out in aqueous or non-aqueous media, the latter is preferred for the purpose of minimizing the anodic formation of other compounds such as zinc and cadmium hydroxides and oxides. Illustrative of non-aqueous media found suitable for practicing the invention are alcohol and dimethyl formamide. The films or coatings produced by this invention may be formed on bulk metal anodes or on thin film metal anodes supported on suitable substrates.

In the course of the investigation leading to the present invention, metal articles consisting essentially of Cd, Zn, or Cd-Zn alloys were prepared and cleaned to remove major foreign material deleterious to the anodic conversion process. The cleaned metal articles were then connected as anodes and immersed in electrolyte contained by electrolysis cells connected to a source of electric power. The process was carried out with electrolyte containing anions substantially all of which were yielded from sulfur or selenium.

Both DC and AC anodic conversion processes were conducted. Cathodes employed in the DC process were of a material, such as graphite or platinum, which was essentially inert with respect to the electrolyte employed. In the AC process, two electrodes of similar geometry and composition were used and at any instant, one was the anode and the other was the cathode. In both the DC and AC processes, application of a voltage to the cells resulted in the formation on the anode surfaces of semiconductive films which were observed to grow in thickness as the applied voltage was increased. Film thickness was increased by this means until the film growth process became unstable and evidence of dielectric breakdown, in the form of small sparks, appeared in the anodic film. Continuation of the process at voltages above that needed to produce sparking resulted in increased film porosity and opaqueness. However, such films were still characterized by luminescence. It is thus seen that the inventive process provides a measure of control of the microscopic structural features of the film or coating, and is operable over at least the following range of conditions:

TABLE I.—CONDITIONS UNDER WHICH INVENTION OPERABLE

Solvent: Ethanol, methanol, dimethylformamide, ethylenediamine.
Solute: Any soluble alkali sulfide, anhydrous or hydrated, highly purified or with the impurities customarily present in commercially available chemicals, such as $Na_2SO_4$, $Na_2SO_3$, $Na_2S_2O_3$, NaOH, etc.
Concentration: Greater than .005 N
Temperature: $-20°$ to $+60°$ C.
Current density: $2\times10^{-5}$ amp/cm.$^2$ to 0.5 amp/cm.$^2$
Voltage: 0 to 350 v., A.C. or D.C.
Anodes: Cd or Zn, pure or impure, single crystals or polycrystalline, chemically or mechanically cleaned, specular, dull or rough surfaces.
Cathodes: Inert (Pt or C) with D.C. operation; two like electrodes with A.C. operation.

To further claritfy my invention, CdS, for example, will be formed by the anodic reaction of S=ion with Cd. The resulting CdS film is completely devoid of any sulfur, and only sulfides are present as conclusively determined by chemical and X-ray data. S, or Se, in accordance with my invention, is not deposited on Zn or Cd and the elemental deposit then converted to a compound. My compounds are formed in one step by electrochemical means, and may be described as "anodically electrolytically formed." Thus, when the anode is removed from the bath, the final compound is present on the anode surface in finished form with no further steps being necessary other than the washing away of any excess solution, and then drying. It is interesting to note that if the voltage is applied beyond the dielectric breakdown point, an increase in porosity, internal surface area and opaqueness of coating will result.

The products and processes of my invention are further described and illustrated by the non-limiting examples hereinunder set forth.

EXAMPLE I

A single crystal Cd anode of high purity (99.999%) was oriented such that anodization thereon would take place on the 0001 plane. Prior to anodization, the crystal was first electropolished, then electro-etched and polished in a solution of 55% by volume phosphoric acid in water. Residual acid was washed repeatedly with distilled water followed by repeated washings with dry ethanol. The surfaces of the anode were kept wet with ethanol until introduction thereof into a cell equipped with a Pt cathode, a temperature regulating means, automatic stirring means, and other means for controlling the atmosphere above the electrolyte. The electrolyte is a solution of 0.1 N $Na_2S\cdot9H_2O$ in ethanol which was maintained at 25° C. under an argon atmosphere.

In forming the CdS film, voltage was applied to the cell, starting at zero and increasing it continuously in order to maintain anode current density at 1.2 ma./cm.$^2$ of anode surface. Under these conditions, the required voltage was found to increase at a generally constant rate and a film of CdS formed on the anode surface. An anode voltage of 60 volts D.C. was attained in approximately 12 minutes. The film thickness on the anode is approximately 1500 A., is transparent and clear yellow in color, and exhibited a resistivity of about $10^{11}$ ohms centimeters. The anodic film supported an electric field of about $4\times10^6$ volts/cm. during formation.

EXAMPLE II

A single crystal Zn anode was prepared, introduced into a cell, and a film grown thereon, as described under Example I. The resultant film however is ZnS, and is colorless and transparent.

EXAMPLE III

A single crystal Cd anode was prepared in a manner similar to that described in Example I. The cell however contained selenide anions, in a concentration of 0.1 N in ethylenediamine. Voltage is applied as described previously. An anode voltage of 75 volts D.C. was attained in 14 minutes. The resultant film was reddish in appearance and was shown by X-ray diffraction analysis to be CdSe.

Modification of the composition of the aforementioned anodic films and coatings in such manner as to enhance luminescent emission or obtain specific semiconductor properties was a further investigatory subject leading to the present invention. It was found that certain materials when incorporated in the basic compositions of the anodic films and coatings function as "activators" in enhancing bright electroluminescent emission. Thus, anodic treatment of Zn and Cd anodes containing minor amounts, not to exceed more than about 5 atomic percent, of such alloy constituents as Mn, Cu and Al resulted in the formation of anodic, luminescent films and coatings wherein such constituents were present in minor amounts. Similarly, minor amounts of halide ions added to the aforementioned electrolytes were found to co-deposit with the S or Se and become incorporated in the anodically formed, luminescent films and coatings.

Examples of activators and halide ions in my inventive films are set forth hereinbelow for purposes of illustration:

EXAMPLE IV

A polycrycstalline Cd was prepared in a manner generally similar to that described in Example I. The solution was .05 N in sulfide and .05 N in selenide, for a total anion concentration equalling of 0.1 N in ethylenediamine. An anode voltage of 92 volts D.C. was attained in 15 minutes. The resultant film was similar to that produced under the procedure set forth in Example III, and comprised a solid solution of CdS and CdSe.

EXAMPLE V

A polycrystalline Zn-Cd alloy consisting of nominally 49.5 atomic percent Zn, 49.5 atomic percent Cd, and 1.0 atomic percent Cu comprised the anode and was prepared in a manner generally similar to the procedure described under Example I. An anode voltage of 82 volts D.C. was attained in approximately 18 minutes. The resultant film was a solid solution of CdS and ZnS containing copper presumably as a substitutional impurity.

EXAMPLE VI

Very similar to Example V except that anhydrous $Na_2S$ in dry ethanol was used as the electrolyte.

EXAMPLE VII

The anode was polycrystalline cadmium. The electrolyte was a solution which was 0.1 N in $Na_2S$ (anhydrous) and 0.005 N in $NH_4Cl$ in dry ethanol. The preparation and procedure was generally similar to the description given in Example I. The resultant film was predominantly CdS, but contained chloride as evidenced by nuclear activation analysis and chemical tests. The chloride is presumed to occupy anion sites in the CdS lattice.

I claim:

1. A method of making an article having a semiconductor coating thereon comprising cleaning a metal selected from the group consisting of Cd, Zn, and Cd-Zn alloys, immersing the cleaned metal in an electrolyte containing anions substantially all of which are yielded from the group consisting of sulfides, selenides, and sulfoselenides, said electrolyte being contained by a cell connected to a source of electric power, said cell including a cathode immersed within said electrolyte, said cathode consisting of a material essentially inert with respect to said electrolyte, connecting said electric power to said immersed prepared and cleaned metal as an anode and to said cathode, and electrochemically forming coating as a compound in a single step by applying a voltage across said cell to cause formation of said coating on said anode.

2. A method according to claim 1 wherein said cell comprises at least two electrodes of similar geometry and composition and said cell is connected to a source of AC power.

3. A method according to claim 1 wherein said electrolyte comprises a solute selected from the group consisting of hydrated $Na_2S$, anhydrous $Na_2S$, $Na_2SO_4$, $Na_2SO_3$, $Na_2S_2O_3$ and NaOH, and a solvent selected from the group consisting of ethanol, methanol, dimethylformamide and ethylenediamine.

4. A method according to claim 1 including the additional step of further increasing the applied voltage beyond the dielectric breakdown point to increase porosity, internal surfaces, and opaqueness of said coating.

References Cited

UNITED STATES PATENTS

| | | | |
|---|---|---|---|
| 602,872 | 4/1898 | Richards et al. | 204—92 |
| 2,279,187 | 4/1942 | Thompson et al. | 29—585 |
| 2,391,706 | 12/1945 | Jackson et al. | 204—14.1 |
| 2,649,409 | 8/1953 | Von Hippel et al. | 204—38 |
| 3,051,636 | 8/1962 | Kaspaul | 204—92 |
| 3,356,601 | 12/1967 | Inoue | 204—156 |

TA-HSLING TUNG, Primary Examiner

R. J. FAY, Assistant Examiner

U.S. Cl. X.R.

254—56

UNITED STATES PATENT OFFICE

CERTIFICATE OF CORRECTION

Patent No. 3,573,177 Dated March 30, 1971

Inventor(s) William McNeill

It is certified that error appears in the above-identified patent and that said Letters Patent are hereby corrected as shown below:

Column 5, line 24, cancel "prepared" . Column 6, repla claim 3 with the following:

3. A method according to claim 1 wherein said electrolyte comprises a solute selected from the group consisting of hydrated $Na_2S$ and anhydrous $Na_2S$, and a solvent selected frc the group consisting of ethanol, methanol, dimethylformamide and ethylenediamine.

Signed and sealed this 12th day of December 1972.

(SEAL)
Attest:

EDWARD M.FLETCHER,JR.
Attesting Officer

ROBERT GOTTSCHALK
Commissioner of Paten

FORM PO-1050 (10-69)